United States Patent [19]
Murakami

[11] Patent Number: 5,345,518
[45] Date of Patent: Sep. 6, 1994

[54] PATTERN GENERATOR

[75] Inventor: Yutaka Murakami, Yokohama, Japan

[73] Assignee: Canon Kabushiki Kaisha, Tokyo, Japan

[21] Appl. No.: 169,757

[22] Filed: Dec. 20, 1993

Related U.S. Application Data

[63] Continuation of Ser. No. 758,210, Sep. 12, 1991, abandoned, which is a continuation of Ser. No. 368,099, Jun. 19, 1989, abandoned, which is a continuation of Ser. No. 38,711, Apr. 15, 1987, abandoned.

[30] Foreign Application Priority Data

Apr. 24, 1986 [JP] Japan .................................. 61-93303
Apr. 25, 1986 [JP] Japan .................................. 61-94866

[51] Int. Cl.$^5$ .............................................. G06K 9/36
[52] U.S. Cl. .................................. 382/56; 382/36; 400/103
[58] Field of Search ................. 382/10, 14, 15, 54, 382/30, 36, 58; 400/121, 103, 104, 124

[56] References Cited

U.S. PATENT DOCUMENTS

| | | | |
|---|---|---|---|
| 3,893,558 | 7/1975 | Fulton et al. | 400/124 |
| 4,458,333 | 7/1984 | Smith | 382/56 |
| 4,468,141 | 8/1984 | Rosza | 400/121 |
| 4,627,749 | 12/1986 | Meo et al. | 400/121 |
| 4,635,212 | 1/1987 | Hatazawa | 382/44 |
| 4,660,999 | 4/1987 | Tsuneke | 400/121 |
| 4,680,805 | 7/1987 | Scott | 382/22 |
| 4,686,525 | 8/1987 | Nagata | 382/69 |

Primary Examiner—Joseph Mancuso
Attorney, Agent, or Firm—Fitzpatrick, Cella, Harper & Scinto

[57] ABSTRACT

A pattern generator comprising a memory for storing a plurality of regular character and sign patterns, an input device for receiving as image data a character and sign pattern in a document, a pattern recognition unit for recognizing the character and sign pattern in the image data that the input device has received, a converter for converting the character and sign pattern recognized by the recognition into to the corresponding character and sign code, and an output device for reading from the memory a character and sign pattern corresponding to the character and sign code generated by the converter and outputting the read pattern to a recording medium.

9 Claims, 5 Drawing Sheets

F I G . 4
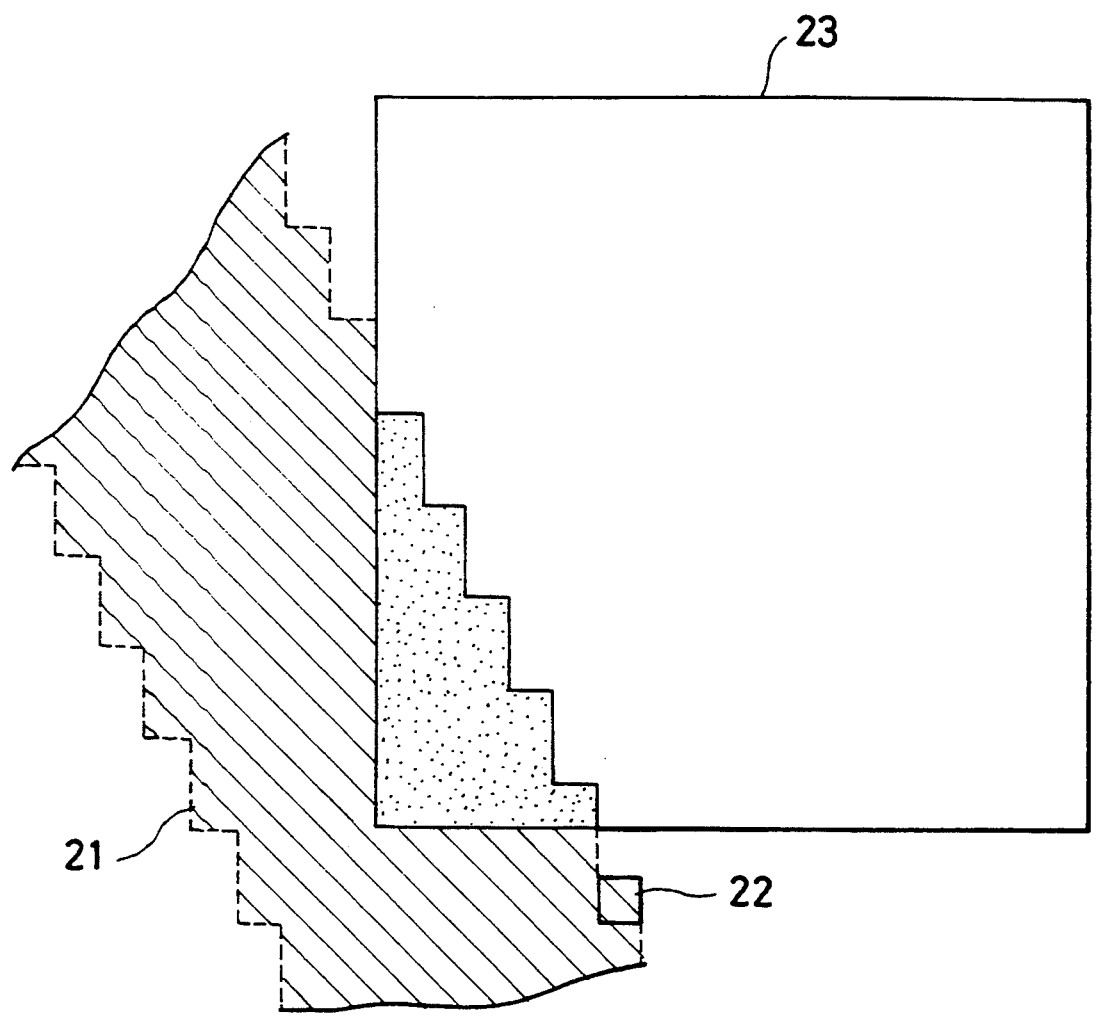

5,345,518

PATTERN GENERATOR

This application is a continuation of application Ser. No. 07/758,210 filed Sep. 12, 1991, now abandoned, which is a continuation of application Ser. No. 07/368,099 filed Jun. 19, 1989, now abandoned, which is a continuation of Ser. No. 07/038,711 filed Apr. 15, 1987, now abandoned.

BACKGROUND OF THE INVENTION

1. Field of the Invention

This invention relates to a pattern generator which generates a picture pattern, for example, of a character to be output.

2. Related Background Art

Conventionally, when a written document is to be printed, the following methods may be used, for example: (1) the document is copied, (2) the document is input using a word processor (typewriter) and printed, and (3) the document is printed using selected printing types as is done in a typical printing. Method (1) involves copying the written documents as they are by electrophotography or the like. For method (2), the operator works a word processor which operates on a host computer while watching a written document to thereby print regular characters. Therefore, the operator must perform many steps of procedure, which requires a great deal of labor and is inefficient timewise. It is obvious, of course, that method (3) requires much more labor and time than method (2).

Especially, process (2) will be described hereinafter. Many conventional printing devices which print a character pattern constituted by dots have a character font pattern ROM. The printing device receives a character and sign code output from, for example, a host computer, reads from the ROM a character pattern corresponding to the code and records it.

When printing is to be performed using external characters, signs or marks (hereinafter referred to as the characters and signs) not reserved in the printing device, or the external characters are to be registered in the printing device, the dot image data constituting the character pattern is made using a software tool working on the host computer and output to a printer.

In order to prepare new characters and signs on the host computer using a tool of that type, keys on the keyboard must be operated. This requires much time and is not easy. Operators who know the method of operating the tool are limited in number.

SUMMARY OF THE INVENTION

In view of the above, this invention is intended to eliminate the above drawbacks. It is an object of this invention to provide a pattern generator which reads a recorded document such as a written document, recognizes characters in the document, and outputs the characters in a clean copy and in a regular character pattern.

In view of the above, this invention is intended to eliminate the above drawbacks. It is another object of this invention to provide a pattern generator which converts an image pattern of characters and signs input by input means to a structure of a predetermined dot density by conversion means, sets a code corresponding to the image pattern, and records the code to thereby permit down-loading to form a font.

Other objects, features and advantages of the invention will be apparent from the following detailed description of the preferred embodiments, taken with the accompanying drawings;

BRIEF DESCRIPTION OF THE DRAWINGS

FIG. 4 illustrates the method of converting dots; and

DETAILED DESCRIPTION OF THE PREFERRED EMBODIMENTS

Embodiments of this invention will now be described with reference to the drawings. A pattern generator referred to herein may be a system constituted by various devices or a device shown in FIG. 1 or 3.

Figure 1:
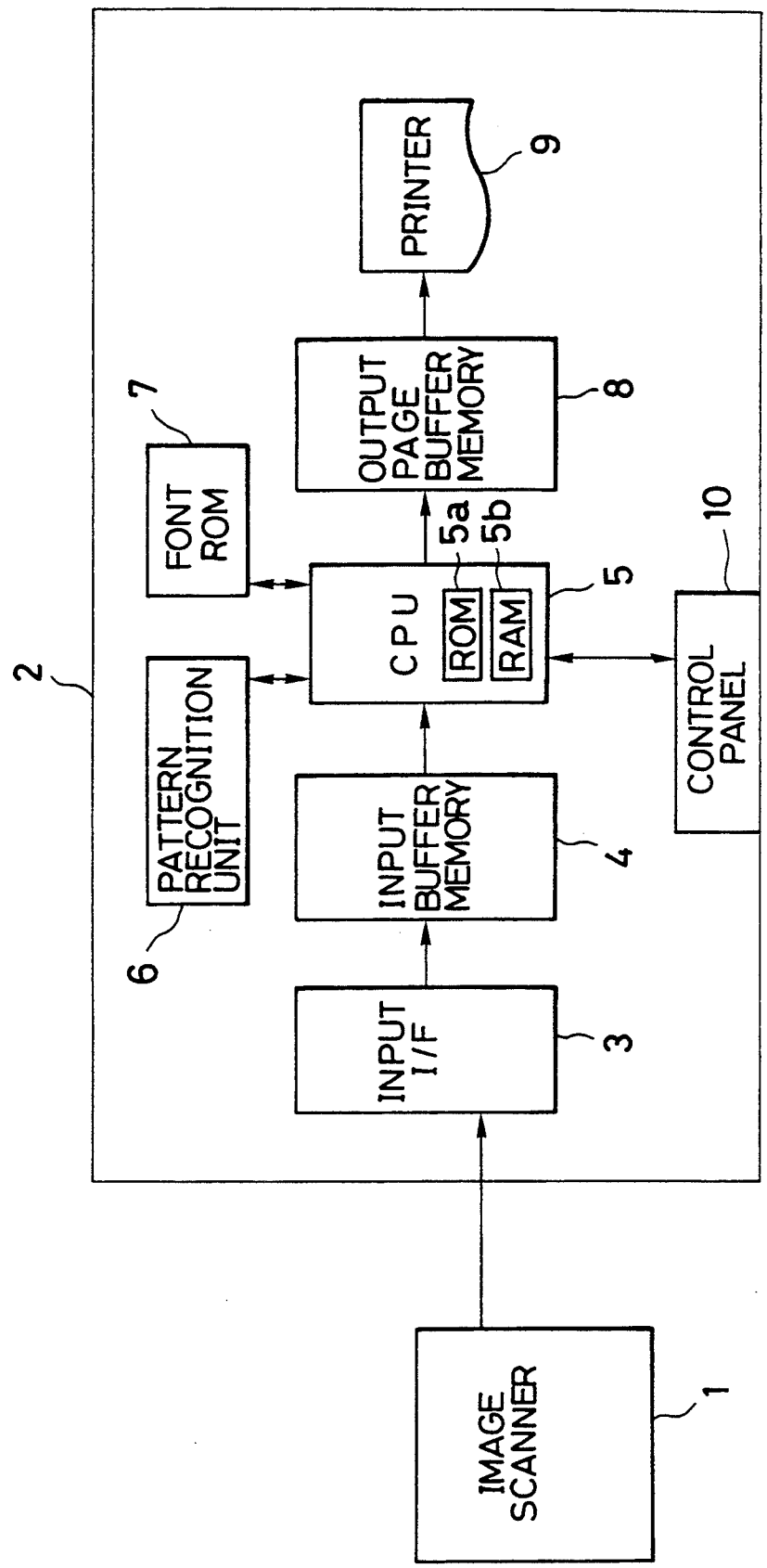
FIG. 1 is a block diagram of a recorder of a first embodiment.

FIG. 1 is a block diagram of a recorder of this embodiment. In FIG. 1, reference numerals 1 denotes an image scanner which reads a written document optically. Reference numeral 2 denotes the recorder proper. Reference numeral 3 denotes an input interface which receives image data from image scanner 1. Reference numeral 4 denotes an input buffer memory which stores image data via interface 3. Reference numeral 5 denotes a CPU which controls the recorder proper 2 and has therein a ROM 5a which stores a program for the flowchart of FIG. 2 to be described in more detail later and a RAM 5b which is used as a work area. Reference numeral 6 denotes a pattern recognition unit which recognizes a character pattern in image data and sends the result as a character code to CPU 5. Reference numeral 8 denotes an output page buffer memory having an image area for each page, the content of which is output to printer 9. Reference numeral 10 denotes a control panel to operate this pattern generator. Manuscript paper should have thereon a checkerboard pattern or grid of predetermined sized squares, and characters each should be written in a corresponding square so that recognition unit 6 can easily recognize the written characters. Since recognition unit 6 knows the position of the respective squares in advance, it can perform the same recognition of each character as the prior art does without retrieving the position of a character pattern in the input image data. However, this invention is not limited to this approach, and information written on a sheet of regular paper can be processed by this invention, of course.

Figure 2:
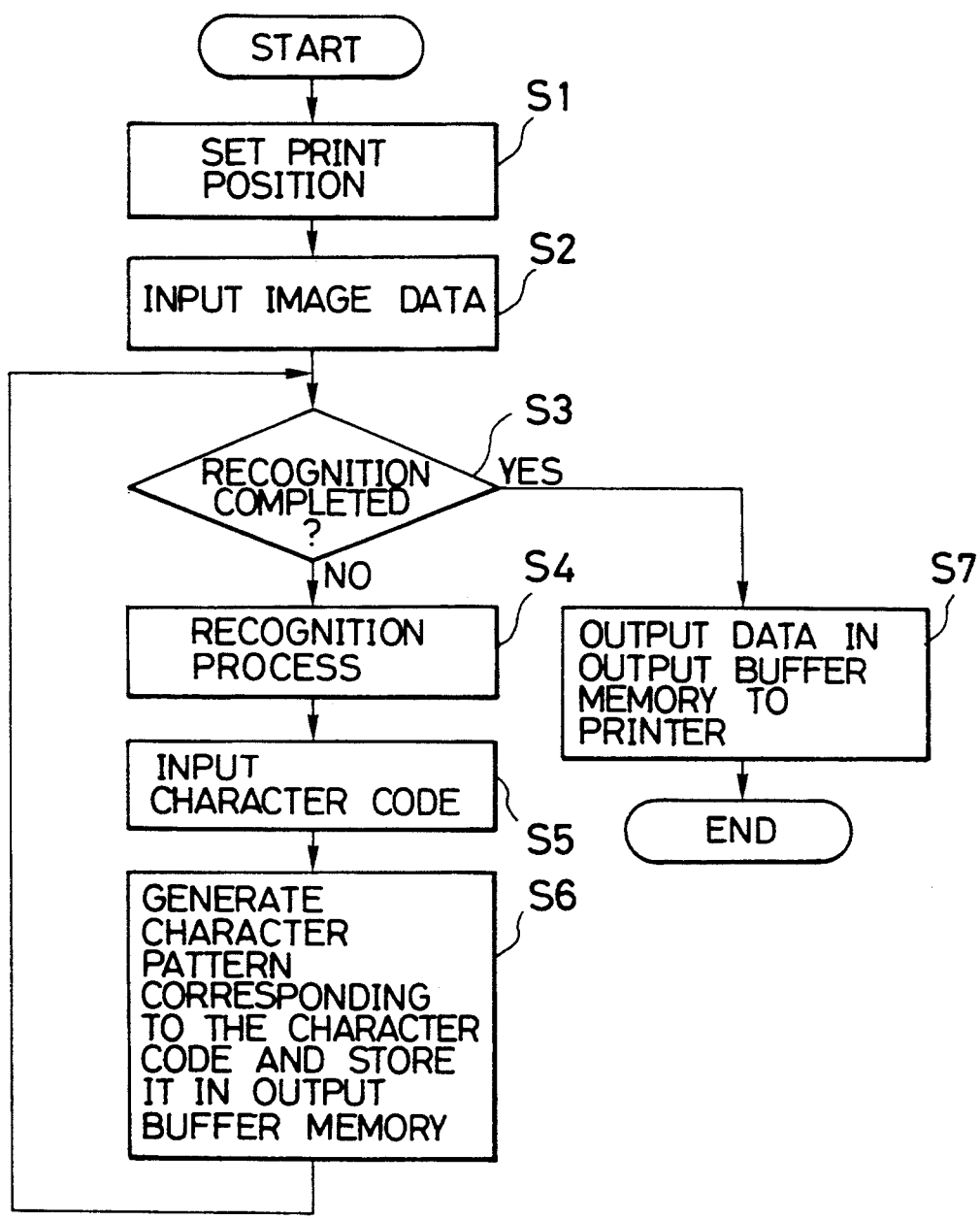
FIG. 2 is a flowchart for explaining the operation of this embodiment.

The operation of a recorder of this embodiment, as constructed above, will next be described with reference to FIG. 2. First, at step S1 a print position on a recording sheet is set from control panel 10. At step S2 recorder 2 receives image data from scanner 1 and stores the data in input buffer memory 4. At step S3 it is checked whether or not recognition of a character has been completed. At this point, a shift is made to step S4 because no recognition has been completed. At step S4 a character pattern in the image data stored in input buffer memory 4 is recognized and the appropriate character code is sent to CPU 5. At step S5 the character code stored in the generator is input from the pattern recognition unit to CPU 5. At step S6 a regular character pattern possessed by the generator and corresponding to the character and code is generated and stored (its size is changed in accordance with the desired printing size) at a position set in output buffer memory 8, and a return is then made to step S3. Thereafter, this operation is repeated. When the recognition has been completed at step S3, a shift is made to step S7 where the data stretched in memory 8 is output to printer 9 to form a visual image.

As described above, according to this embodiment, it is possible to recognize written characters sequentially, store the data in terms of a regular character pattern in a memory to output the characters to thereby alleviate the load imposed on the operator.

While in this embodiment the processing has been described in which written characters are sequentially recognized and output, for example, documents on which one character is written may be recognized page by page to be output.

As described above, according to this invention, patterns of characters input from outside are sequentially recognized, written in a memory in terms of regular character patterns and appropriate sizes and output. That is, the input characters are output in a clean copy, so that the load imposed on the operator will be alleviated.

Figure 3:
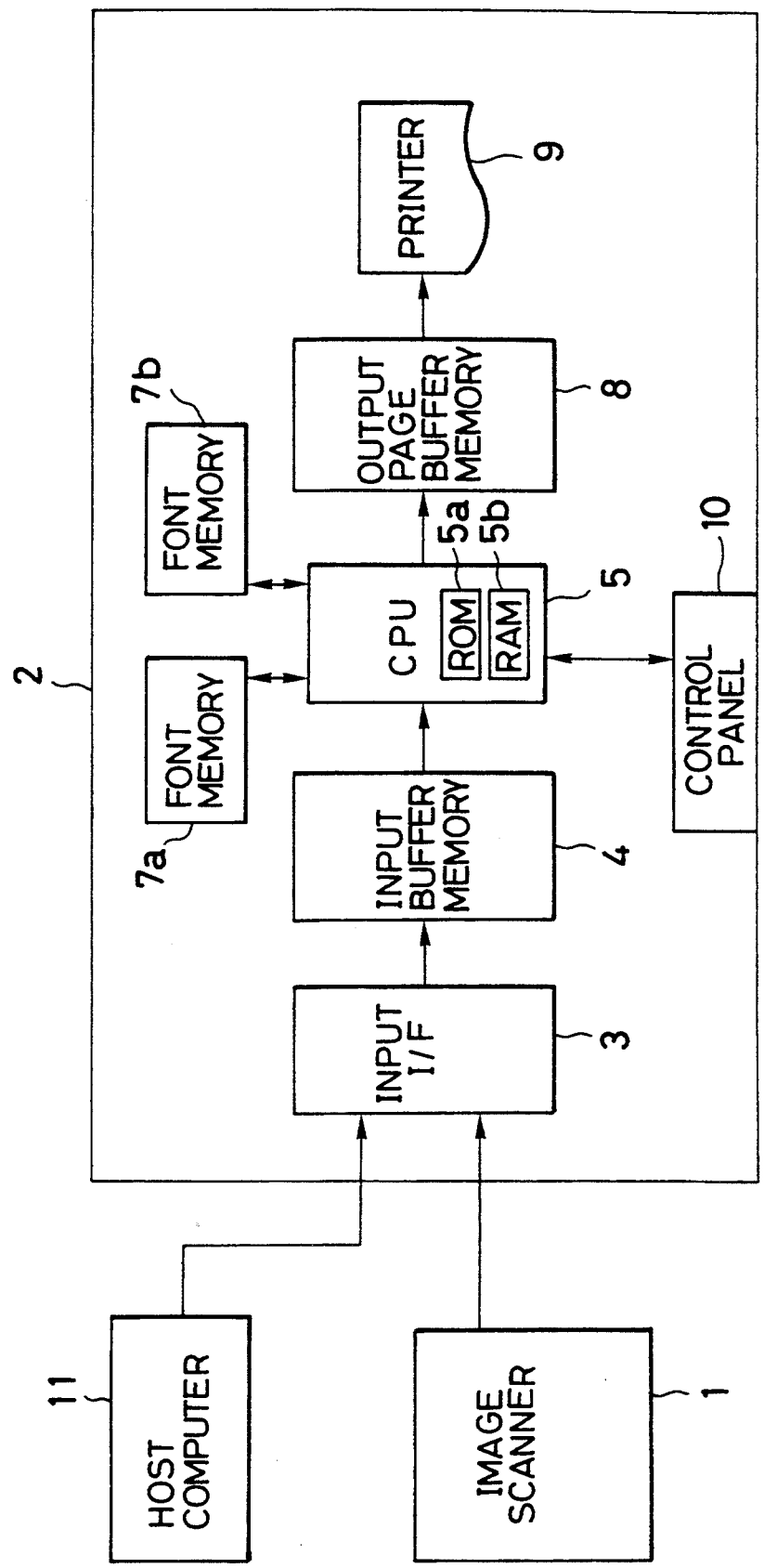
FIG. 3 is a block diagram of a recorder of another embodiment.
Figure 5:
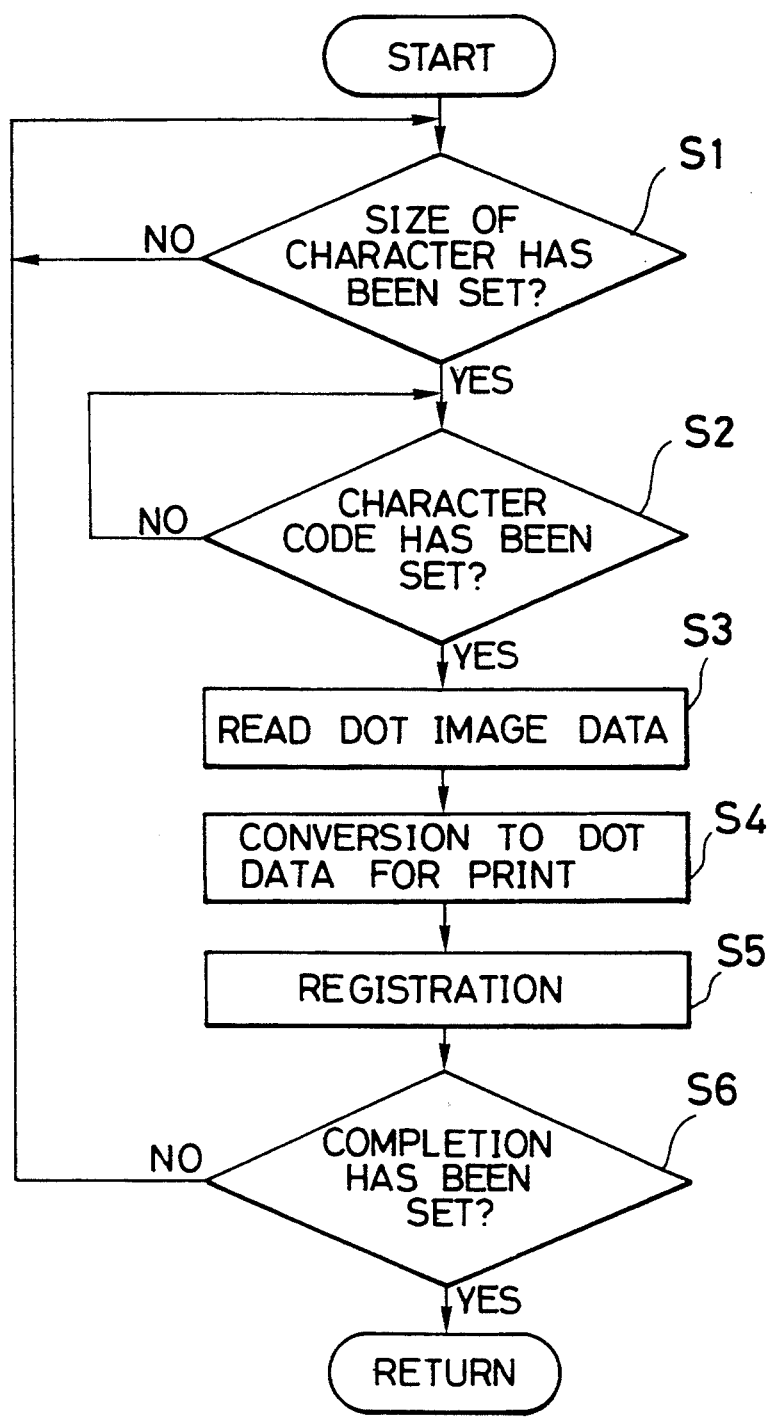
FIG. 5 is a flowchart for explaining a download routine which is another embodiment.

Another embodiment of this invention will now be described with respect to the accompanying drawings. This embodiment involves reading printed characters and prepares the fonts of the read characters in the present generator. This embodiment will be described as being applied to a printer, but this invention is not limited to this. In FIG. 3, elements similar to those in FIG. 1 are similarly numbered. Reference numeral 1 denotes an image scanner including an image input device which converts character pattern information to dot image information and outputs it to a printer. Reference numeral 2 denotes the printer unit proper. Reference numeral 3 denotes an interface which receives image data transmitted from image scanner 1 and print data transmitted from host computer 11. Reference numeral 4 denotes an input buffer memory which temporarily stores the data via interface 3. Reference numeral 5 denotes a central processing unit (hereinafter referred to as the CPU) including a general-purpose microprocessor which controls the entire printer. It includes a ROM 5a in which a program for the flowchart of FIG. 5 is stored, and RAM 5b usable as a work area. Reference numeral 8 denotes an output page buffer memory which sequentially stores print information of dot type for one page fed from CPU 4. Reference numeral 9 denotes the printer which forms on a sheet of paper a permanent visual image from the dot signal delivered from the output page buffer memory 8. Reference numeral 10 denotes a control panel which controls the printer unit 2. Reference numeral 7a denotes a font memory which stores a character pattern (in this embodiment, 30×60 dots). Reference numeral 7b denotes a font memory which can store a plurality of newly prepared character font patterns. Reference numeral 11 denotes a host computer which transmits print data.

The down-load including generation of a character pattern or reading of a character and sign pattern for storing is performed by operating control panel 10 to receive one-character patterns sequentially from image scanner 1. At this time, the pattern of a character is input from a picture in the image scanner 1. The received data is reduced, for example, to 1/80 in length and breadth.

Namely, when a character to be printed in 30×60 dots is to be formed, a character sized 2,400×4,800 dots on the scanner is to be input. At this time, if the resolution of image scanner 1 is 300 dpi, the printed character becomes 8 cm×16 cm in size, and 6,400 dots (80×80 dots) in the scanner become one dot in the character pattern.

The dot conversion at this time will be described with reference to FIG. 4 in which the crosshatched portion 21 denotes an area constituting a character pattern read from image scanner 1. A pixel 22 in the cross-hatched portion 21 corresponds to one dot sent from scanner 1. Reference numeral 23 shows the size of one dot in a newly generated print character pattern (hereinafter referred to as the print dot to compare with the size of a pixel from the image scanner 1). A group of pixels (80×80 dots) input from image scanner 1 is converted to print dots 23 in the following manner. If in this embodiment more than half of 6,400 bits of the input pixel group is on (the strippled portion in FIG. 4), one dot of the print character and sign pattern is prepared in such a manner that those bits of the printed character pattern corresponding to this dot are on. Such processing is performed on the entire group of pixels to form (generate) a print character and sign pattern. The formed (generated) print character and sign pattern is stored in font memory 7b.

The operation of this embodiment which performs the above processing will now be described with reference to the flowchart of FIG. 5. When a down-load routine is started, first, at step S1 it is determined from control panel 10 whether or not the size of one character such as mentioned above is set. This determination process is repeated (if necessary) until the size of one character is fully set. Then, a shift is made to step S2 where a character and sign code corresponding to a character and sign pattern to be prepared by down-load is input. Thereafter, if this character and sign code is input, the printer proper 2 will record and print in this print and sign pattern. Next at step S3 dot image data representing the character pattern is read from image scanner 1. An area of one-picture data corresponding to the size of the character set at step S1 with reference to the left upper corner is made effective. The effective data is converted to print dot data at step S4 by the process explained in FIG. 4. At step S5 the converted dot data is stored in font memory 9b together with the character and sign code input at step S2. At step S6 it is determined whether or not the down-load of the character and sign has been completed. Namely, it is determined from control panel 10 whether or not a key for completing the down-load mode or a key for commanding the continuation of the down-load mode has been pressed. When the key for commanding continuation has been pressed, a return is made to step S1 to perform similar processing. If the key completing the down-load mode has been pressed, the down-load mode processing is completed to return to the normal print mode.

As described above, according to this embodiment, a print character and sign pattern can be prepared by reading the existing character and sign pattern without preparing the character and sign pattern by operating the keyboard.

While in this embodiment two font memories 7a, 7b are provided, the number of font memories may be one. The resolution of the image scanner and the conversion magnification to print a character do not limit this invention at all.

While in this embodiment the image scanner 1 is used as an image input device, a digitizer or an image inputting device other than the image scanner may be used.

While in this embodiment characters are downloaded one by one, the picture of scanner 1 may be divided into pieces to form a plurality of characters at once.

The character and sign pattern input from the image scanner may be read from a document, for example, already printed. By inputting written characters, it is possible to print using a font in the form of a character written by the user himself, for example.

While this embodiment involves application to a printer, it may be applicable to the formation of a character and sign pattern at the host computer by reading the existing character and sign pattern in similar manner, converting the data to a character and sign pattern of a predetermined dot structure, and compiling the converted pattern into a desired character and sign pattern by the operator's working to thereby easily permit the formation of a character and sign pattern without forming a character and sign pattern.

As described above, according to this invention, a character and sign pattern can very easily formed to alleviate the operator's labor therefor. In addition, any desired character pattern, mark, etc., can be easily formed.

What I claim is:

1. A pattern generator comprising:
   input means for receiving a character pattern of a first dot density, the character pattern existing at a designated area;
   conversion means for converting the character pattern of the first dot density received by said input means into a character pattern of a second dot density;
   means for setting character code data corresponding to the character pattern of the second dot density converted by said conversion means; and
   means for storing the character pattern of the second dot density converted by said conversion means in correspondence with the character code data set by said setting means.

2. A pattern generator according to claim 1, wherein said setting means includes means for inputting a code, and wherein said generator stores said image pattern in correspondence to said input code to form a new font pattern without converting the image pattern to a font pattern that said generator includes.

3. A pattern generator according to claim 1, wherein said input means comprises an image scanner.

4. A pattern generator according to claim 1, wherein a set of the character codes are input from a host computer.

5. A pattern generator comprising:
   input means for receiving a character pattern of a first number of dots;
   conversion means for converting the pattern of the first number of dots received by said input means into a character pattern of a second number of dots;
   means for setting character code data corresponding to the character pattern of the second number of dots converted by said conversion means; and
   means for storing the character pattern of the second number of dots converted by said conversion means in correspondence with the character code data set by said setting means.

6. A pattern generator according to claim 5, wherein said input means comprises an image scanner.

7. A pattern generator according to claim 5, wherein a set of the character codes are input from a host computer.

8. An information processing system comprising:
   input means for inputting image data of a first dot density;
   extracting means for extracting a character pattern from the input image data, the character pattern existing at a designated area;
   conversion means for converting the character pattern of the first dot density extracted by said extracting means into a character pattern of a second dot density;
   means for setting character code data corresponding to the character pattern of the second dot density converted by said conversion means;
   means for storing the character pattern of the second dot density converted by said conversion means in correspondence with the character code data set by said setting means; and
   output means for outputting, in response to input of code data, the character pattern stored in said storage means in correspondence with the input code data.

9. A printer comprising:
   input means for receiving a character pattern of a first dot density, the character pattern existing at a designated area;
   conversion means for converting the character pattern of the first dot density received by said input means into a character pattern of a second dot density;
   means for setting character code data corresponding to the character pattern of the second dot density converted by said conversion means;
   means for storing the character pattern of the second dot density converted by said conversion means in correspondence with the character code data set by said setting means; and
   printing means printing, in response to input of code data, the character pattern stored in said storage means in correspondence with the input code data.

* * * * *